US005631936A

United States Patent [19]

Theroux et al.

[11] Patent Number: 5,631,936

[45] Date of Patent: May 20, 1997

[54] METHOD AND ARRANGEMENT FOR COMPRESSION SEALING AN OMEGA JOINT

[75] Inventors: John F. Theroux, Westfield, Mass.; Witold R. Blercz, Canton, Conn.; Kenneth A. Martin, Windsor, Conn.; Adrian P. Wivagg, Tolland, Conn.

[73] Assignee: Combustion Engineering, Inc., Windsor, Conn.

[21] Appl. No.: 208,621

[22] Filed: Mar. 9, 1994

[51] Int. Cl.$^{6}$ .................................................. G21C 13/00

[52] U.S. Cl. ......................... 376/204; 376/203; 376/205; 376/234; 376/239

[58] Field of Search .................................. 376/204, 203, 376/205, 234, 239; 285/158, 350, 161, 415, 406; 976/DIG. 167, DIG. 171, DIG. 174, DIG. 176

[56] References Cited

U.S. PATENT DOCUMENTS

| | | | |
|---|---|---|---|
| 3,640,845 | 2/1972 | Ripley | 376/230 |
| 3,775,247 | 11/1973 | Ode et al. | 376/229 |
| 3,926,722 | 12/1975 | Dupen | 376/205 |
| 4,048,010 | 9/1977 | Eschenfelder et al. | 376/223 |
| 4,076,144 | 2/1978 | Raas et al. | 220/367 |
| 4,089,535 | 5/1978 | Sattinger | 277/236 |
| 4,100,019 | 7/1978 | Groff et al. | 376/204 |
| 4,195,457 | 4/1980 | Kissling et al. | 52/224 |
| 4,218,067 | 8/1980 | Halling | 277/205 |
| 4,272,084 | 6/1981 | Martinson et al. | 277/30 |
| 4,569,669 | 2/1986 | Starling | 464/175 |
| 4,584,163 | 4/1986 | Hankinson | 376/205 |
| 4,591,195 | 5/1986 | Chelette et al. | 285/332.3 |
| 4,826,217 | 5/1989 | Guerrerd | 285/158 |

*Primary Examiner*—Charles T. Jordan
*Assistant Examiner*—Meena Chelliah
*Attorney, Agent, or Firm*—John H. Mulholland; L. James Ristas

[57] ABSTRACT

An omega seal (32) between a housing (24) having a circumferential omega lip (38) including a free end, and a reactor vessel nozzle (22) having a complimentary omega lip (40) including a free end. A semi-rigid, annular seat member (60) is placed within one of the lips, and the housing is positioned in vertical alignment with the nozzle so that the free end of the housing lip and the free end of the nozzle lip are juxtaposed, thereby forming an omega structure having a cavity (44) occupied by the seat member, a gap (42) between the free ends of the lips, and an outer surface (47,49) on either side of the gap. A semi-rigid ring (46) is positioned in conforming relation to the outside surface of the omega structure. A compressive force is applied and maintained on the exterior of the seal ring, thereby extruding a portion of the ring into the gap. In essence, the weldment which fills the gap in the conventional technique, is replaced in accordance with the present invention, by a semi-rigid ring under compression, which extrudes into and fills the gap.

13 Claims, 4 Drawing Sheets

METHOD AND ARRANGEMENT FOR COMPRESSION SEALING AN OMEGA JOINT

BACKGROUND OF THE INVENTION

The present invention relates to nuclear power reactors, and more particularly, to method and apparatus for sealing penetrations to the nuclear reactor vessel.

On pressurized water nuclear reactors, the control rod drive mechanisms are mounted on the reactor vessel head. The mechanisms are located in pressure boundary housings and provide controlling motion to the neutron absorbing control rods. The housing components are assembled to each other and joined with an omega type seal weld. These assemblies are then located and welded to the reactor vessel nozzles using omega seal welds. Maintenance on the control rod drive mechanisms, or replacement of the control rods or reactor vessel head, requires cutting of at least one omega weld. Due to cracking or other problems that have been found in penetrations to the reactor vessel head, some utilities have decided to replace the reactor vessel head. This approach requires the cutting of one of the omega welds on every one of dozens of control rod drive mechanism housings, so that these housings can be removed from the original head and re-installed on the new reactor vessel head. The re-welding of each omega seal, and the necessary inspection of the new weld, are laborious, time consuming processes if performed in the conventional manner, because they must be performed remotely in a confined, highly radioactive area.

SUMMARY OF THE INVENTION

It is, accordingly, an object of the present invention, to improve the way in which omega seals can be effected on the penetrations to a reactor vessel, by avoiding a weld and its associated weld prep, equipment qualification and set up, and verification procedures.

The present invention comprises a method of forming an omega seal between a housing having a circumferential omega lip including a free end, and a reactor vessel nozzle having a complimentary omega lip including a free end. A semi-rigid, annular seat member is placed within one of the lips, and the housing is positioned in vertical alignment with the nozzle so that the free end of the housing lip and the free end of the nozzle lip are juxtaposed, thereby forming an omega structure having a cavity occupied by the seat member, a gap between the free ends of the lips, and an outer surface on either side of the gap. A semi-rigid ring is positioned in conforming relation to the outside surface of the omega structure. A compressive force is applied and maintained on the exterior of the seal ring, thereby extruding a portion of the ring into the gap. In essence, the weldment which fills the gap in the conventional technique, is replaced in accordance with the present invention, by a semi-rigid ring under compression, which extrudes into and fills the gap.

Upon completion of the foregoing procedure, the vessel nozzle forms a circumferential lip extending generally obliquely to the nozzle axis and defining a substantially upward-facing seal surface. The housing is coaxially situated above and has a housing lower portion resting against the nozzle upper portion. The housing lower portion includes a circumferential lip extending generally obliquely to the axis and defining a substantially downward facing seal surface in confronting, spaced relation to the seal surface on the nozzle lip. These lips form an omega structure including a gap between the seal surfaces, an annular cavity situated within the lips, and a compression surface along the outside of the lips. An omega seat of semi-rigid material substantially fills the cavity. A semi-rigid seal ring has an inner surface that conforms against substantially all the compression surface, thereby covering the gap. A seal carrier supports the outer surface of the seal ring laterally and below the omega seal structure. Fixture means are connected to the housing, for urging the seal carrier against the semi-rigid seal ring, thereby compressing the seal ring against the compression surface such that a portion of the seal ring extrudes into the gap to form a seal between the lips.

DESCRIPTION OF THE PREFERRED EMBODIMENT

Figure 1:
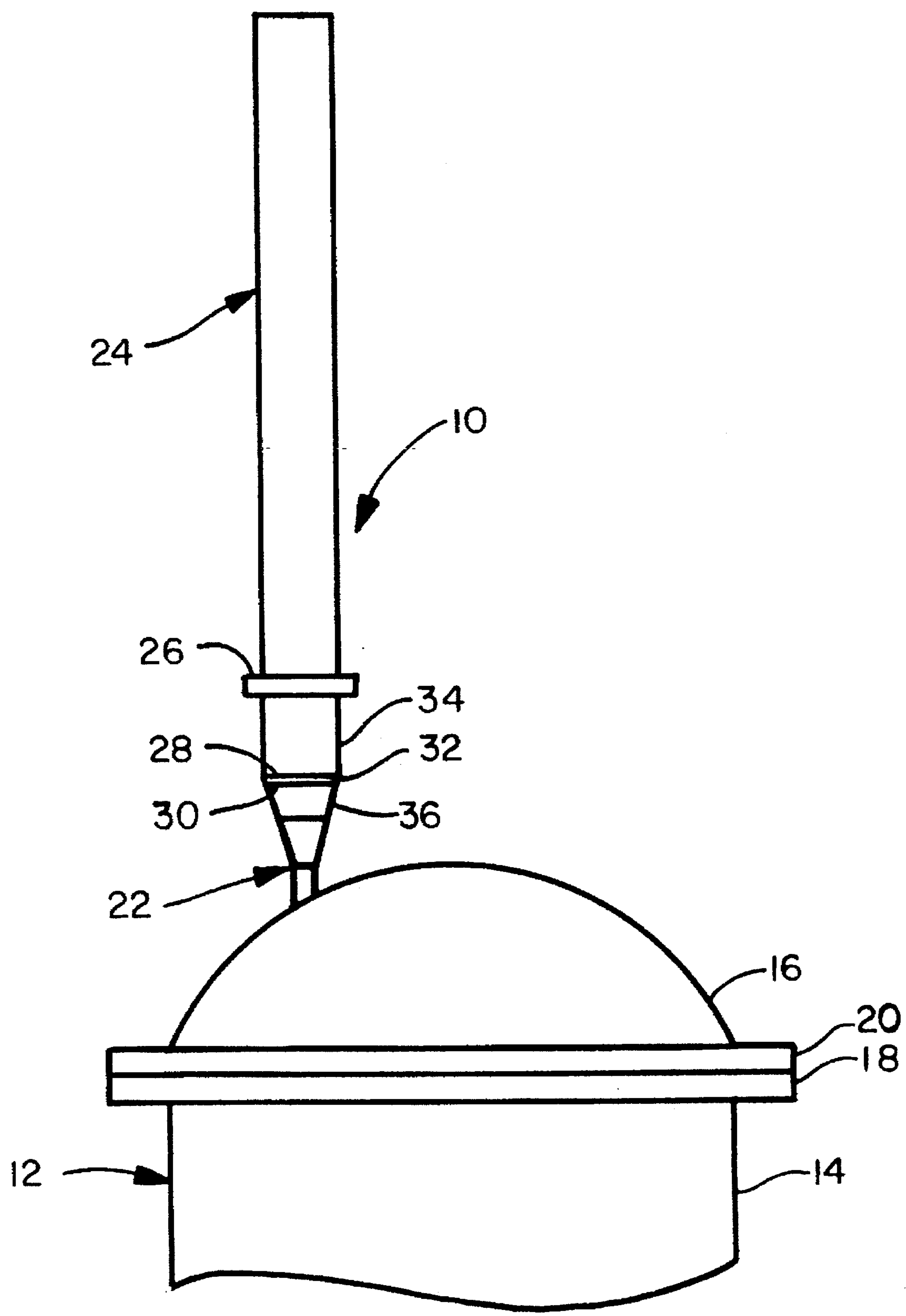
FIG. 1 is a schematic elevation view of the upper portion of a nuclear reactor vessel, showing a control rod drive mechanism housing connected to a reactor vessel nozzle extending from the reactor vessel head.

FIG. 1 shows a portion of a nuclear reactor system 10 having a reactor 12 including a substantially upright cylindrical vessel 14 and a substantially semi-hemispherical head 16. The vessel has an upper flange 18 and the head has a lower flange 20 which are bolted together in a known manner for normal operation of the reactor system 10. As is well known in the field of nuclear engineering, the nuclear power generated in the reactor can be controlled by the increase or decrease in the amount of neutron absorbing material that is inserted into or withdrawn from the core in the vessel 14. This is typically accomplished by a plurality, normally at least several control rod clusters or assemblies (not shown) each of which pass through a nozzle such as 22. For the purpose of simplifying the present description, only one of the reactor vessel nozzles 22 in the head 16 is shown, but it should be appreciated that normally there are at least as many nozzles 22 as control rod assemblies to be moved into and out of the vessel 14 during operation. Each control rod assembly is housed in a control rod drive mechanism housing 24, which has an associated motor (not shown) for effectuating the movement of the control rods. The control rod drive housing 24, control rod assemblies, and associated motor are in all respects conventional and form no part of the present invention.

Conventionally, the control rod drive housings 24 include a circumferential shoulder or flange 26 near the housing lower portion 34, which is adapted to mate with the nozzle upper portion 36. Specifically, the housing lower end 28 confronts the nozzle upper end 30, with the confronting ends carrying omega seal structure welded to establish a circumferential weld line 32. In the field, the housings 24 are densely packed and provide minimal area for weld repair.

Figure 2:
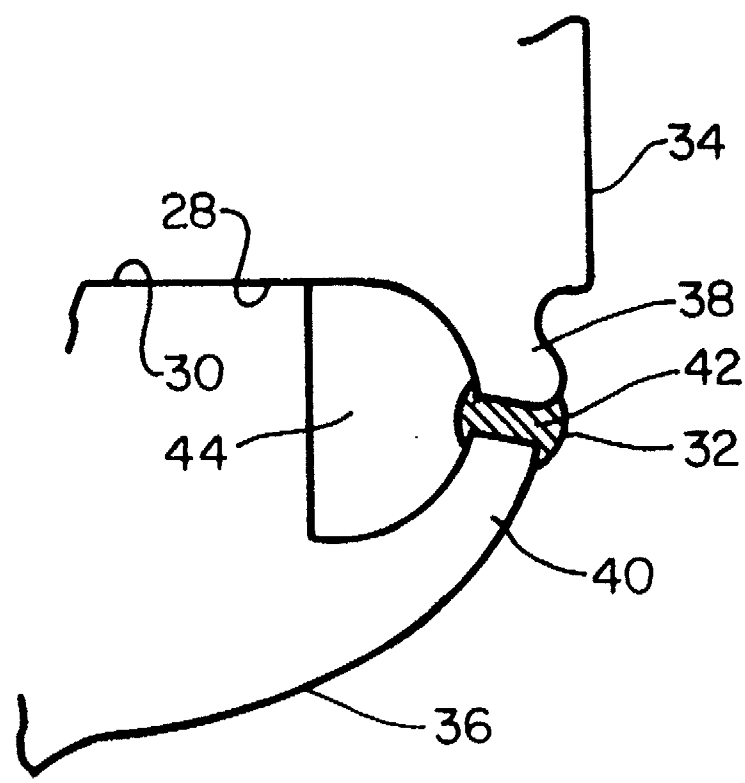
FIG. 2 is an enlarged view of the conventional technique by which weldment fills the gap between the confronting surfaces of the lower portion of the control rod housing and the upper portion of the reactor vessel nozzle of the arrangement shown in FIG. 1.

FIG. 2 shows the conventional arrangement for joining the housing 24 to the reactor vessel nozzle 22. The housing lower portion 34 includes a circumferential lip 38 which faces obliquely downwardly and the nozzle upper portion 36 defines a circumferential lip 40 which faces obliquely upwardly, defining a gap 42 with the upper lip 38 when the housing lower end 28 abuts the nozzle upper end 30. The lips, along with the nozzle upper end 36, form a substantially annular dead space 44, which resembles a "D" shape when viewed in section. In a more conventional terminology, when viewed from the right-side of FIG. 2, the lips and the associated dead space, appear to form an "omega" shape. Conventionally, the weldment 32 joins the two lips, thereby forming a seal. The weight of the housing 24 is transmitted to the nozzle 22 via the abutting surfaces 28,30, whereas the weldment 32 provides only a sealing function. Moreover, this seal can be a secondary seal, and not the primary pressure boundary seal, which can be accomplished in a conventional manner within the housing 24.

Figure 3:
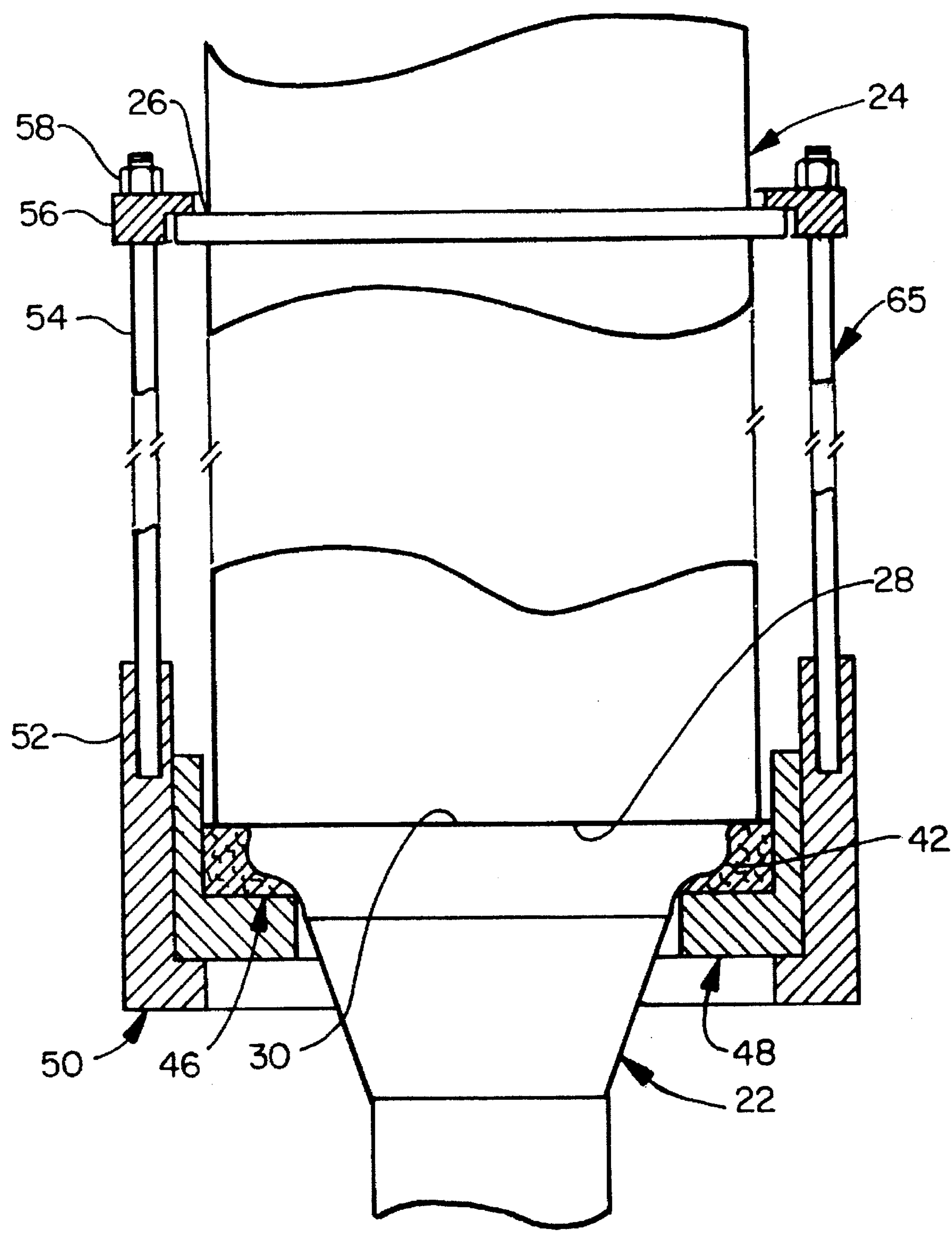
FIG. 3 is a schematic, elevation view of the sealing arrangement for replacing the weldment of FIG. 2, in accordance with the present invention.
Figure 4:
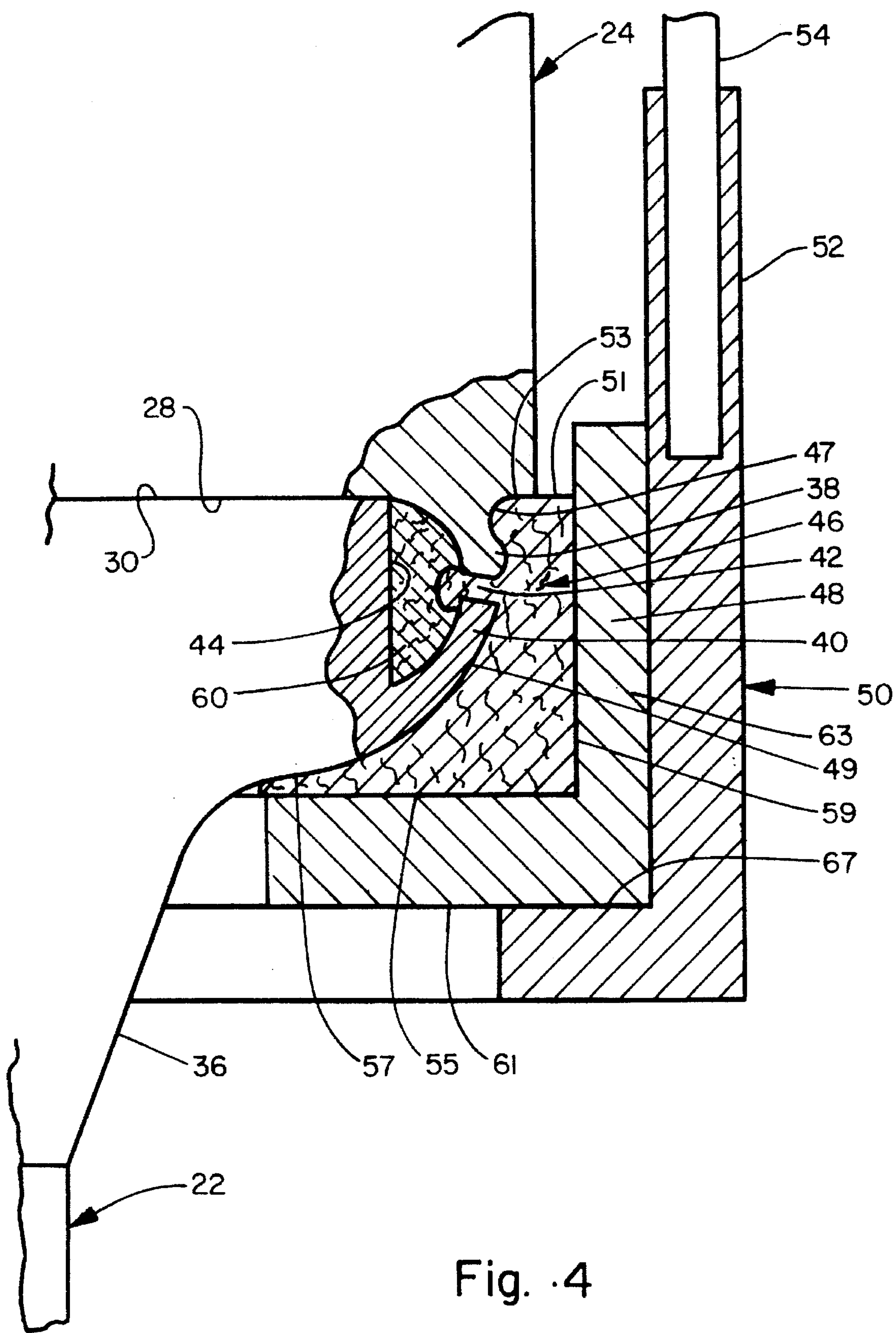
FIG. 4 is an enlarged view of the omega seal associated with the arrangement of FIG. 3.

FIGS. 3 and 4 show how the weldment 32 of FIG. 2 is eliminated and replaced by a compression seal, in accordance with the present invention. As in FIGS. 1 and 2, the housing 24 and the nozzle 22 are coaxially aligned with the weight transferred via abutting surfaces 28,30. A semi-rigid split seal ring 46 surrounds the outer portions 47,49 of the lips 38,40, which act as compression surfaces in a manner to be described more fully below. The seal rings 46 have a pre-established inner surface that generally follows the contour of the compression surface. The upper end 51 of the seal ring fits against the shoulder 53 formed at the outer diameter of the lower end 34 of the housing, and the lower portion 55 of the seal ring fits against the shoulder or contour 57 of the nozzle upper portion 36. A substantially annular seal carrier 48 surrounds the ring 46, providing a cradle that supports the lower surface 55 and the radially outer surface 59 of the ring. In particular, the seal carrier 50 has an open-bottomed split flange portion 61 and a vertically extending cylindrical portion 63 which is coaxial with the seal ring 46.

A compression fixture shown generally as 65, includes an open-bottomed lower compression flange 50 which has a shape generally similar to that of the seal carrier, but includes a link joint 52 in the vertically extending cylindrical portion. The bottom, or flange portion of the component 50 is spaced laterally of the nozzle upper portion 36 and below the nozzle lip 40, so as to provide a shoulder 67 for the bottom of the seal carrier 48. Link structure such as rod 54 extends vertically from link joint 52, to an upper compression flange 56 supported by flange 26 on the control rod drive mechanism housing 24. It can be appreciated that with this arrangement, the upper flange 56 is restricted by flange 26 from downward movement, such that an upwardly directed force through link joint 52 transmits forces onto the seal ring 46. This is preferably achieved via hydraulically tightening clamp nuts 58. The nut flange and washer assembly 56,58 when tightened, directly tensions device 54. Other possible implementations of the compression fixture 65 could also be substituted by those familiar with this field of technology.

With the present invention, a semi-rigid material such as Graphoil Grade GTJ or GTN (available from the Union Carbide Company), is situated as an omega seat 60 in the space 44 within the lips 38,40. These prevent the compressive force on the exterior of the lips, from excessively deforming, collapsing or breaking the lips. The gap 42, which is of the same size as is conventional, e.g., about 0.047 inch (1.2 mm), is filled and sealed as a result of extrusion of the seal ring 46 due to the compressive forces that have been applied via the tightening device 58. The seal ring is also preferably a Graphoil material. These compressive forces should be sufficient to extrude ring material entirely through the gap and into contact with the seat 60. As used herein, the term "semi-rigid" material means having the capacity to extrude into, and conform to the shape of a gap when compressed at ambient temperature.

The arrangement shown in FIG. 3 is accomplished in the field, by placing the seat member 60 within the lip 40, before the control rod drive housing 24 is lowered onto the nozzle 22. In addition, the Graphoil seal ring 46, seal carrier 48, and lower compression flange 50 are all nested together as split segments, located laterally of, then moved toward the nozzle 22, where they are held in place by an assembly fixture (not shown) located temporarily on the nozzle 22. The assembly fixture can be of a "clam shell" design capable of quick and easy installation and removal from the nozzle 22. The control rod drive housing 24 is then lowered onto the nozzle so that surfaces 28,30 come into contact. The links 54 are lowered so that the upper flange 56 engages flange 26 and the link points 52 are connected. The tightening device 58 is then activated until a sufficient pressure is transmitted through the seal carrier 48 so as to result in the sealing configuration shown in FIG. 4. Compression is most effective when the seal ring 46 is "boxed in" between shoulders 57 and 51.

It may be appreciated that with the present invention, a significant savings in manpower and time is achieved. One complete omega seal can be effected with the present invention, in approximately one hour, which is a reduction from the conventional technique, which takes approximately four hours. This quick installation significantly reduces the radiation to which the technicians are exposed. The invention allows the seal closure to be compressed, thereby making the seal, without any concern over distorting the lips. This allows a successful seal and, in the event the seal is to be removed at a later date, the integrity of the omega seal area (i.e., the shape of the lips and the size of the gap), has not experienced any distortion.

Moreover, the invention is applicable not only to control rod penetrations, but also to penetrations for in-core detector strings or the like.

We claim:

1. An arrangement for joining an elongated housing to a nuclear reactor vessel nozzle by means of an omega seal, comprising:

a vessel nozzle rigidly extending along a vertical axis from a reactor vessel and having a nozzle upper portion which includes a circumferential lip extending generally obliquely to said axis and defining a substantially upward-facing seal surface;

an elongated housing coaxially situated above and having a housing lower portion resting against, the nozzle upper portion, said housing lower portion including a circumferential lip extending generally obliquely to said axis and defining a substantially downward-facing seal surface in confronting, spaced relation to the seal surface on the nozzle lip;

whereby said lips form an omega seal structure including a gap between the seal surfaces, an annular cavity situated within the lips, and a compression surface along the outside of the lips;

an omega seat of semi-rigid material substantially filling said cavity;

a seal ring of semi-rigid material having an inner surface in intimate, conforming relation against substantially all of said compression surface, thereby covering said gap;

seal carrier means for supporting the outer surface of the seal ring laterally and below said omega seal structure; and fixture means connected to the housing, for urging the seal carrier means against the seal ring, thereby compressing the seal ring against said compression surface such that a portion of the seal ring extrudes into said gap to form a seal between said lips.

2. The arrangement of claim 1, wherein the housing has a shoulder situated above the housing lip, the nozzle upper portion forms a shoulder below and radially inwardly of the nozzle lips, and said fixture means operatively extend in tension between the housing shoulder and the nozzle shoulder.

3. The arrangement of claim 2, wherein the fixture means include, an open-bottom lower compression flange spaced laterally of the nozzle upper portion and in supportive contact with the seal carrier means, rod means extending vertically from the lower compression flange to said housing shoulder, and means connected between the rod means and the housing shoulder, for drawing the rod means and the lower compression flange toward the housing shoulder, thereby compressing the seal ring.

4. The arrangement of claim 1, wherein the housing is a control rod drive mechanism housing.

5. The arrangement of claim 1, wherein the semi-rigid material of the seal ring is Graphoil or equivalent.

6. The arrangement of claim 5, wherein the semi-rigid material of the omega seal is Graphoil or equivalent.

7. The arrangement of claim 1, wherein the seal ring is composed of split ring segments.

8. The arrangement of claim 7, wherein the seal carrier means includes a split annular flanged portion on which the seal ring rests.

9. The arrangement off claim 3, wherein each of the compression flange, carrier means, and seal ring is formed by split segments.

10. The arrangement of claim 2, wherein only the seal ring is in contact with the nozzle shoulder.

11. A method of forming an omega seal between an elongated housing having a circumferential omega seal lip including a free end, and a nuclear reactor vessel nozzle having a complementary omega seal lip including a free end, comprising:

placing a semi-rigid, annular seat member within one of the lips;

positioning the housing in vertical alignment with the nozzle so that the free end of the housing lip and the free end of the nozzle lip are juxtaposed, thereby forming an omega structure having a cavity occupied by said seat member, a gap between the free ends of the lips, and an outer surface on either side of the gap;

positioning a semi-rigid ring in conforming relation on the outside surface of the omega structure; and applying and maintaining a compressive force on the exterior of the ring, thereby extruding a portion of the ring into said gap.

12. The method of claim 11, wherein the step of applying and maintaining a compressive form is preceded by the steps of:

supporting split ring segments of said sealing ring on respective split segments of fixture means;

locating the fixture means laterally of the nozzle;

moving the fixture means toward the nozzle until the seal ring is in contact with the outside surface of the nozzle omega seal lip.

13. The method of claim 12, wherein the step of applying and maintaining a compressive force includes tensioning the fixture means between shoulders on the housing and on the nozzle, to produce said compressive force on said seal ring.

* * * * *

UNITED STATES PATENT AND TRADEMARK OFFICE

CERTIFICATE OF CORRECTION

PATENT NO. : 5,631,936

DATED : May 20, 1997

INVENTOR(S) : John F. Theroux et al

It is certified that error appears in the above-indentified patent and that said Letters Patent is hereby corrected as shown below:

Cover page: item [75], second line, "Blercz" should read --Biercz--.

Signed and Sealed this

Fourteenth Day of October, 1997

Attest:

BRUCE LEHMAN

Attesting Officer

Commissioner of Patents and Trademarks